United States Patent [19]

André et al.

[11] 3,993,590

[45] Nov. 23, 1976

[54] PROCESS FOR PREPARING SPHEROIDAL SILICO-ALUMINA PARTICLES

[75] Inventors: Jacques Maurice Jules Ghislain André; Raymond Marc Cahen, both of Brussels; Henri Robert Debus, Meise; Rene Odon Lammers, Brussels; Hugo Johannes Van Thillo, Grimbergen, all of Belgium

[73] Assignee: Labofina S.A., Brussels, Belgium

[22] Filed: Feb. 10, 1975

[21] Appl. No.: 548,184

[30] Foreign Application Priority Data

Feb. 18, 1974 Luxembourg .......................... 69405

[52] U.S. Cl. ............................... 252/430; 252/439; 252/448; 252/455 R
[51] Int. Cl.² ........................................ B01J 37/00
[58] Field of Search ............... 252/448, 455 R, 430, 252/439

[56] References Cited
UNITED STATES PATENTS 2,526,907  10/1950  Schmerling .................... 252/448 X
2,966,466  12/1960  Schwartz ........................ 252/448 X
3,472,791  10/1969  Vesely .......................... 252/455 R X
3,746,657   7/1973  Miller et al. ................... 252/439 X
3,776,987  12/1973  Grimes et al. .................. 252/448 X Primary Examiner—Patrick P. Garvin

[57] ABSTRACT

A process for preparing silico-alumina beads containing silica and at least an equal amount of alumina comprising dispersing as droplets into a hot and practically water-immiscible fluid, an aqueous mixture which comprises alumina hydrogel, alumina hydrosol as alumina precursors, an alkali silicate and silica gel as silica precursors, the amount of alkali silicate, based on $SiO_2$, not exceeding 20% of the total weight of $SiO_2$ and $Al_2O_3$, and the total amount of alkali silica and silica gel, based on $SiO_2$, not exceeding 50% of the total weight of $SiO_2$ and $Al_2O_3$, and at least a water-soluble monomer whose uncross-linked polymer is water-soluble or forms a gel, and maintaining the droplets of the aqueous mixture in the hot fluid until substantial polymerization of said monomer occurs.

12 Claims, No Drawings

PROCESS FOR PREPARING SPHEROIDAL SILICO-ALUMINA PARTICLES

BACKGROUND OF THE INVENTION

The present invention relates to a process for preparing spheroidal silico-alumina particles.

The metallic oxides and particularly the mixtures of aluminium oxide and silicium oxide or silico-alumina, are widely used in the chemical industry. For most of these applications, silico-alumina is preferably used in the form of spheroidal particles or beads. Among the main advantages of these beads is better wear and crushing strength. Also, these beds may be more regularly distributed into the reactors, thereby reducing the pressure drop of the reactants passing through the reactors. In order to obtain metallic oxide beads of uniform sizes, a hydrosol of these oxides generally is introduced in droplets into a hot and practically water-immiscible fluid, acting as a gelling medium.

The application of this method to produce silico-alumina beads presents some drawbacks. Even if an alumina hydrosol is used as an alumina source, the gelling time of the silico-alumina mixture dispersed as droplets is particularly long and does not permit production of beads in a time period feasible for industrial application. To remedy such drawback, a gelling agent generally is used, most often a weak base. The obtained beads generally must be immediately subjected to an aging treatment. When compounds other than hyrosols are used as the alumina source, the addition of the gelling agent generally gives mixtures which prematurely stiffen and which cannot be dispersed as droplets into the gelling medium.

An object of the present invention is to provide a new method for preparing silico-alumina beads.

Another object of the present invention is to provide a method for producing silico-alumina beads employing alumina hydrogel.

A further object of the present invention is to provide a method for producing silico-alumina beads by the method of dispersion into a hot fluid, the wet beads obtained being workable and stable.

Still another object of the present invention is to provide a direct method for producing beads which, after drying and calcining, have a high mechanical strength and which can be used as catalysts or catalyst supports.

SUMMARY OF THE INVENTION

The present invention is a process for producing silico-alumina beads containing silica and at least an equal amount of alumina comprising polymerizing, in a hot and practically water-immiscible fluid, an aqueous mixture containing alumina hydrogel and hydrosol as the alumina source, an alkali silicate and silica gel as the silica source, the amount of alkali silicate, based on $SiO_2$, not exceeding 20% of the total weight of $SiO_2$ and $Al_2O_3$ in such source compounds, the total amount of silica gel and alkali silicate, based on $SiO_2$, not exceeding 50% of the total weight of $Al_2O_3$ and $SiO_2$ in such source compounds and at least a water-soluble monomer whose uncross-linked polymer is water-soluble or forms a gel, this aqueous mixture being dispersed as droplets into the hot fluid in which a substantial polymerization of the monomer occurs.

More particularly, the process of the present invention comprises (a) preparing an aqueous mixture comprising alumina hydrogel and hydrosol as $Al_2O_3$ precursors, an alkali silicate and silica gel as $SiO_2$ precursors, the amount of alkali silicate, based on $SiO_2$ not exceeding 20% of the total weight of $SiO_2$ and $Al_2O_3$ and the total amount of silica gel and alkali silicate, based on $SiO_2$, not exceeding 50% of the total weight of $SiO_2$ and $Al_2O_3$, and at least a water-soluble monomer whose uncross-linked polymer is water-soluble or forms a gel, (b) dispersing the aqueous mixture obtained in (a) above as droplets into a hot and practically water-imiscible fluid, under polymerization conditions suitable for polymerization of the monomer contained in each droplet of aqueous mixture, and (c) recovering beads formed thereby and thereafter drying and calcining such beads in order to obtain silico-alumina beads containing silica and at least an equal amount of alumina.

Another embodiment of the process of the present invention comprises (a) preparing an aqueous mixture which consists essentially of from 5 to 20% by weight, based on metallic oxides, of $Al_2O_3$ and $SiO_2$ precursors, the $Al_2O_3$ precursors consisting of an alumina hydrogel and hydrosol mixture, the $SiO_2$ precursors consisting of alkali silicate and silica gel, the amount of alkali silicate, based on $SiO_2$ not exceeding 20% of the total weight of $SiO_2$ and $Al_2O_3$, and the total amount of alkali silicate and silica gel based on $SiO_2$ not exceeding 50% of the total weight of $SiO_2$ and $Al_2O_3$ and about 0.25 to 20% by weight of at least a water-soluble monomer, ethylenically unsaturated monomer whose uncross-linked polymer is water-soluble or forms a gel, and about 0.05 to 2% by weight of a polymerization catalyst, (b) dispersing said aqueous mixture as droplets into a water-immiscible fluid having a temperature of 50° to 105° C at atmospheric pressure, (c) maintaining the droplets in this mixture until beads are formed and become hard, and (d) recovering said beads.

DESCRIPTION OF THE PREFERRED EMBODIMENTS

One of the $Al_2O_3$ generators is alumina hydrogel which may be prepared in accordance with any known method. Preferably preparation is by treating aluminium sulphate with a base, by by hydrolysing isopropylate or another aluminium alcoholate, or by treating an alkali aluminate with an acid or an aluminium sulphate. The precipitate obtained from such techniques is waterwashed and then dried. The other $Al_2O_3$ generator is an alumina hydrosol. The hydrosols can be prepared from aluminium bromide, aluminium sulphate, aluminium alcoholate or preferably aluminium chloride, or by digesting metallic aluminium into hydrochloric acid or hydrated aluminium chloride. In this latter case, it may be considered that hydrosols have the following formula:

wherein $x$ is comprised between 4 and 6. In the starting aqueous mixture, the weight ratio of alumina hydrogel to alumina hydrosol may vary between relatively wide limits and generally is between 99 : 1 and 50 : 50 and more particularly between 85 : 15 and 55 : 45, the hydrogel and hydrosol weights being based on $Al_2O_3$. A preferred embodiment of the process for preparing the starting aqueous mixture consists in digesting hydrogel into hydrosol and water, this treatment being accelerated by higher temperatures.

As $SiO_2$ generators, an alkali silicate generally is used, preferably sodium silicate (or water-glass) and silica gel. When the $SiO_2$ source amount in the aqueous mixture does not exceed 20% by weight (based on $SiO_2$) of the total amount of $SiO_2 + Al_2O_3$, alkali silicate may be used as the sole $SiO_2$ precursor. However, when the amount of $SiO_2$ source exceeds 20%, a mixture of alkali silicate and silica gel is used. It has been found that it is advantageous to use undried silica gel, the beads obtained after drying and calcining being of better crushing strength.

The starting aqueous mixture must remain sufficiently free flowing at room temperature to allow an easy dispersion in the form of droplets into the polymerization medium. However, in order to avoid any excessive investment and drying costs of the beads obtained by the present process, to dilute solutions of the starting mixture are to be avoided. Preferably, an aqueous mixture is used containing in a finely divided form, from 5 to 20% of alumina and silica precursors, these percentages being based on metallic oxides present. In order to avoid the coagulation of the sodium silicate in the starting mixture, it is preferable to use a mixture of oxide generators and monomers having a pH which does not exceed 4 and which generally is comprised of between about 3 and 4. In some cases and particularly when an acid-monomer is used, the aqueous mixture preferably is acidified with hydrochloric acid.

The respective amounts of alumina precursors and of silica precursors may vary between wide limits. However, in order to obtain silico-alumina beads remaining stable upon calcination and having the required properties of crushing strength, alumina and silica precursors preferably are used in such proportions that the obtained silico-alumina contains from 0.5 to 50% by weight of silica and from 99.5 to 50% by weight of alumina.

The water-soluble monomer whose uncross-linked polymer is water-soluble or forms a gel is selected from the group consisting of ethylenically unsaturated compounds comprising acrylic compounds of the general formula

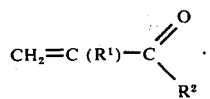

wherein $R^1$ is H or a methyl radical and $R^2$ is a $-OR^3$ or $-NR^3R^4$ radical, with $R^3$ and $R^4$ in such radical being H or a hydrophilic radical, particularly a hydroalkyl radical containing from 1 to 2 carbon atoms or a methoxy methyl radical. Non-limiting examples of such compounds are acrylic acid, methacrylic acid, acrylamide, methacrylamide, N-hydroxy-methylacrylamide, N-hydroxymethylmethacrylamide, N-methoxymethylacrylamide, N-methoxymethylmethacrylamide, ethyleneglycol monoacrylate, ethylene-glycol monomethacrylate and the like. The choice of the monomer depends primarily on economic conditions, and, for that reason, acrylic acid, methacrylic acid, acrylamide and mixtures thereof preferably are used. Reference to the term "water-soluble monomer whose uncross-linked polymer is water-soluble" also shall include ethylenically unsaturated monomers containing a greater part of monomers whose uncross-linked polymers are water-insoluble and a lesser part of monomers whose uncross-linked polymers are water-insoluble.

The amount of said water soluble monomer used depends on many factors such as amounts of $Al_2O_3$ and $SiO_2$ precursors, monomer types, desired apparent density for the final calcined beads, etc. Generally, the amount of said monomer is between 0.25 and 2% by weight of the aqueous mixture. It has been observed that the behavior of the beads obtained according to the process of the present invention depends on the respective amounts of $Al_2O_3$ and $SiO_2$ precursors and of monomer. Preferably, the amount of said monomer is an amount corresponding to about 5 to 100% of the weight of precursors used (based on oxide). Higher amounts of monomers may induce a disaggregation of the beads upon calcination. Too low an amount of monomer results in the production of beads which are not readily workable and not very firm. In order to obtain beads which present, after calcination, interesting properties with regard to density and mechanical strength, the aqueous mixtures preferably used contain an amount of monomer corresponding to about 5 to 75% by weight of the $Al_2O_3$ and $SiO_2$ precursors (based on oxides).

The starting mixture is dispersed into a substantially water-immiscible fluid, having a temperature between about 50° and 105° C, at atmospheric pressure. Preferably, the aqueous mixture is introduced with the aid of calibrated orifices or nozzles in order to obtain a subdivision of said mixture in the form of droplets which are dispersed into the fluid. The residence-time of the droplets in the fluid must be sufficient to permit the polymerization of the monomers. This water-immiscible fluid may be a gas, such as dry air, which is introduced into a tower in counter-current flow to the droplets of the starting aqueous mixture. Another advantageous embodiment of the invention is the using, as such fluid, of a water-immiscible liquid. This liquid may have a density higher than that of the beads to be prepared. In such instance, the starting aqueous mixture is introduced as droplets at the bottom of a column containing the liquid and the beads formed are then recovered from the surface of the liquid. Another embodiment consists in using a liquid medium whose density is lower than that of the beads, such as a mineral oil. A generally used such technique is described in U.S. Pat. No. 2,620,314. Such technique consists in using a column filled with hot oil in which droplets of an aqueous mixture are let to fall, the residence-time of the droplets in the oil being sufficient to allow the polymerization of the polymer. Temperature of the liquid is at least equal to about 50° C, in order to reduce the polymerization time. Temperatures higher than about 105°–110° C result in an evaporation of water and a disaggregation of beads unless the process is carried out under pressure. According to a preferred embodiment, the temperature of the water-immiscible liquid is between 75° and 100° C and the pressure at about atmospheric pressure.

In order to reduce the time needed for the beads to form, it is advantageous to use means for promoting the polymerization of the monomers. Free radical catalysis techniques with peroxidic compounds are particularly advantageous, and especially useful is the redox system catalysis, which consists of using as catalyst a combination of a peroxidic compound and a reducing agent. Persulphuric acid, hydrogen peroxide, perboric acid and their salts, particularly sodium, potassium or ammonium persulphates and the water-soluble peracids, such as peracetic acid, are examples of useful peroxidic compounds. Reducing agents may be selected from the group consisting of sodium thiosulphate, sodium hyposulphite or dithionite, sodium or potassium bisulfite, N, N, N', N'-tetramethylethylene-diamine, sodium formaldehydro-sulfoxylate, hydrazine, ascorbic acid, etc. A part of the reducing agent may be introduced into the starting aqueous mixture, the other part being added into the water-immiscible fluid in which the polymerization is performed to the extent such reducing agent is soluble in the fluid. It may be added into the vessel in which the beads are recovered.

The term "polymerization catalyst", as used herein, includes the peroxidic compounds when the latter are used without reducing agent, or the combination of the peroxidic compound and the reducing agent. The amount of polymerization catalyst can vary widely and it depends on the content of the inhibitors present in the monomers used. Generally, the amount of polymerization catalyst is between about 0.05 and 2% by weight of aqueous mixture when monomers are substantially free of inhibitors.

The mixture subjected to polymerization may contain a cross-linking agent which has functional groups so that the polymer chains are linked together and form a three dimensional structure. Cross-linking agents may be 1,3-di(acryl- or methacryl-amidomethyl)-2-imidazolidone, hexahydrotriacryloyltriazine, N, N-methylidene-bis-acrylamide and alkylidene-bis-acrylamides, such as N, N'methylene-bis-acrylamide and N, N'-ethylidene-bis-acrylamide when the acrylic monomer used has an amide group, an aldehydic compound may be used as cross-linking agent, such as formaldehyde and glyoxal. Glyoxal reacts with a part of acrylamide to form N, N'-dihydroxyethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture, although higher amounts may be used, but without any significant advantage.

The beads obtained after polymerization of the monomer are workable and stable. They can be stocked, before or after waterwashing. Generally, these beads are subjected to a thermal treatment, particularly drying at a temperature of 110°–120° C, and then to calcination which generally is performed by progressively increasing the temperature up to about 400° to 800° C, preferably 500° to 700° C. During this calcination, the organic matter contained in the beads is destroyed and silico-alumina beads are obtained.

When the silico-alumina beads are used as catalyst supports, they were impregnated, by any known method, with solutions of compounds which generate active catalytic agents. Impregnation may be carried out on undried beads or dried beads or on dried and calcined beads. When undried beads are impregnated, the above mentioned thermal treatment converts the compounds which generate catalytic agents into active catalytic agents. If the dried or dried and calcined beads are impregnated it must be subjected to a new thermal treatment.

The catalysts with silico-alumina supports generally comprise active catalytic agents in a metallic compound state (metallic oxides or sulphides) or in a metal state and they are used in processes involving hydrocarbon treatment. In such case, the silico-alumina beads prepared according to the process of the invention are impregnated, before drying, or after drying or after calcination, with a solution of compounds containing a Group VIII and/or Group VI B metal. For instance, if the beads are impregnated with a nickel nitrate aqueous solution after calcination, a catalyst is obtained comprising nickel oxide on a silico-alumina support. If the beads are impregnated with an ammonium molybdate solution, the calcined catalyst consists of molybdenium oxide on a silico-alumina support. The process of the present invention is very flexible and permits preparation of a wide variety of catalysts containing one or more active catalytic constituents. The amount of such active catalytic constituents may vary between very wide limits.

The following examples are presented to illustrate the present invention but are not to be considered limiting. Except as otherwise stated, the percentages given in the Examples are expressed by weight. In the Examples, the mechanical resistance of the beads is expressed by the crushing resistance measured with the Tablet Hardness Tester apparatus (of Manestry Machines Ltd., Liverpool, Great Britain) in which the bead is placed between two plates, one of which is fixed and the other moves for increasing weight. The mechanical resistance values given in the Examples are the average values of experiments performed on five beads.

EXAMPLE 1

An aqueous mixture was prepared containing alumina hydrogel, 8% (based on $Al_2O_3$); alumina hydrosol, 2% (based on $Al_2O_3$); sodium silicate, 0.1% (based on $SiO_2$); acrylic acid, 1.5%; dihydroxyethylene-bis-acrylamide, 0.075%; ammonium persulphate, 0.24%; and sodium bisulphite, 0.024%. Alumina hydrogel was obtained by treeating aluminium sulphate with caustic soda up to pH = 9. The gel obtained was purified by waterwashing several times, and then it was dried at 110° C, crushed and sieved. Alumina hydrosol was obtained by digesting aluminium turnings into aqueous aluminium chloride. The alumina hydrogel and hydrosol and water were mixed together, and this mixture heated at 95° C under stirring for 1 hour. After cooling, the evaporated water was replaced and the mixture was subjected to a vigorous stirring. Thereafter, alkali silicate and acrylic acid were added. The pH of the mixture was 3.1 after this addition. The other constituents were then added. The final mixture was injected dropwise at the head of a column containing paraffinic oil (density $d_{15}^4$ : 0.83) heated at 95° C. Beads were recovered at the bottom of the column, were waterwashed, dried at 110° C and calcined at 700° C. The beads obtained contained about 1% of $SiO_2$ and 99% of $Al_2O_3$. They had an apparent density of 0.53 g/ml and a crushing strength of 2.5 kg.

EXAMPLE 2

An aqueous mixture was prepared as in Example 1 and containing alumina hydrogel, 8% (based on $Al_2O_3$); alumina hydrosol, 2% (based on $Al_2O_3$); sodium silicate, 0.22% (based on $SiO_2$); acrylic acid, 1.5% dihydroxyethylene-bis-acrylamide, 0.075%; ammonium persulphate, 0.24%; and sodium bisulphite, 0.024%. The remainder of Example 1 was repeated. The beads were recovered at the bottom of the column containing oil. They were washed and maintained in a 5.6% ammonium solution for 20 hours. After drying and calcining the beads, the beads contained about 2% of $SiO_2$ and 98% of $Al_2O_3$. They had an apparent density of 0.52 g/ml and a crushing strength of 2kg.

EXAMPLE 3

An aqueous mixture was prepared containing alumina hydrogel, 16% (based on $Al_2O_3$); alumina hydrosol, 1.5% (based on $Al_2O_3$); potassium silicate, 0.45% (based on $SiO_2$); methacrylic acid, 3.25%; acrylamide, 0.15%; glyoxal, 0.10%; ammonium persulphate, 0.34%; and sodium bisulphite, 0.034%.

Otherwise, Example 1 was repeated except as follows: The final mixture was injected dropwise at the bottom of a column containing Phenoclor DP4 (chlorinated diphenyl sold by PROGIL S. A. and having a density of 1.39 at 100° C) heated at 95° C. The beads were recovered from the surface of the liquid and were waterwashed, dried at 100° and calcined at 700° C. The calcined beads contained 2.5% of $SiO_2$ and 97.5% of $Al_2O_3$. They had a crushing strength of 2.1 kg.

EXAMPLE 4

The procedure described in Example 1 was repeated with an aqueous mixture containing alumina hydrogel, 7.6% (based on $Al_2O_3$); alumina hydrosol, 1.9% (based on $Al_2O_3$); sodium silicate, 0.5% (based on $SiO_2$); acrylic acid, 2%; N, N'-ethylene-bis-acrylamide, 0.1%; ammonium persulphate, 0.3%; and sodium bisulphite, 0.03%. After the addition of acrylic acid, pH was 3.3. The beads recovered were waterwashed, maintained in a 5.5% ammonium solution for 2 hours, then dried at 110° and calcined at 700° C. The calcined beads contained 5% of $SiO_2$ and 95% of $Al_2O_3$. They had an apparent density of 0.50 g/ml and a crushing strength of 4.7 kg.

EXAMPLE 5

The procedure described in Example 1 was repeated with an aqueous mixture containing alumina hydrogel, 7.2% (based on $Al_2O_3$); alumina hydrosol, 1.6% (based on $Al_2O_3$); sodium silicate, 1.0% (based on $SiO_2$); acrylic acid, 1.5%; dihydroxyethylene-bis-acrylamide, 0.075%; ammonium persulphate, 0.23%; and sodium bisulphite, 0.023%. After the addition of the acrylic acid, the pH was 3.6. The beads were recovered at the bottom of the column, waterwashed, maintained in a 5.6% ammonium solution for 20 hours, and thereafter dried at 110° and calcined at 700° C. The calcined beads had an apparent density of 0.48 g/ml and a crushing strength of 2.1 kg. They contained 10.2% of $SiO_2$ and 89.8% of $Al_2O_3$.

EXAMPLE 6

The procedure described in Example 1 was repeated with a starting aqueous mixture containing alumina hydrogel, 6.8% (based on $Al_2O_3$); alumina hydrosol, 1.7% (based on $al_2O_3$); sodium silicate, 1.5% (based on $SiO_2$); acrylic acid, 1.5%; dihydroxyethylene-bis-acrylamide, 0.075%; ammonium persulphate, 0.24%; and sodium bisulphite, 0.024%. After the addition of the acrylic acid, the pH of the mixture was 3.8. A low pressure was applied to the dispersal of the final mixture dropwise into the paraffinic oil heated at 95° C. The beads were recovered at the bottom of the column, waterwashed and maintained in a 5.6% ammonium solution for 20 hours. The beads were then dried and calcined and found to contain 15% of $SiO_2$ and 85% of $Al_2O_3$. They had a crushing strength of 2.7 kg.

EXAMPLE 7

The procedure described in Example 1 was repeated with a starting aqueous mixture contained alumina hydrogel, 4.2% (based on $Al_2O_3$); alumina hydrosol, 1.05% (based on $Al_2O_3$); silica hydrogel (93% water), 2.35% (based on $SiO_2$); sodium silicate, 0.23% (based on $SiO_2$); acrylic acid, 3%; dihydroxyethylene-bis-acrylamide, 0.15%; ammonium persulphate, 0.25%; and sodium bisulphite, 0.025%. After the addition of the acrylic acid, the pH of the reaction mixture was 3.6. The beads were recovered at the bottom of the column containing oil, waterwashed, maintained in a 0.05% $NH_4NO_3$ aqueous solution heated at 95° C, and thereafter dried at 110° and calcined at 700° C. The calcined beads contained 32.4% of $SiO_2$ and 67.6% of $Al_2O_3$. They had a crushing strength of 3.2 kg.

Example 8

An aqueous mixture was prepared containing alumina hydrogel, 2.62% (based on $Al_2O_3$); alumina hydrosol, 0.67% (based on $Al_2O_3$); silica hydrogel (93% water), 2.94% (based on $SiO_2$); sodium silicate, 0.33% (based on $SiO_2$); acrylamide, 4%; dihydroxyethylene-bis-acrylamide, 0.2%; ammonium persulphate, 0.5%; and sodium bisulphite, 0.05%. Alumina hydrogel, alumina hydrosol and water were mixed together. This mixture was heated at 95° C for 1 hour. After cooling, the evaporated water was replaced and the mixture was subjected to a vigorous stirring. Acrylamide was added and thereafter, sodium silicate and silica gel were added while the pH was adjusted to 3.3 by the addition of hydrochloric acid. After introducing the cross-linking agent and the catalytic system, the mixture was dispersed dropwise into a column containing paraffinic oil heated at 95° C. Beads were recovered at the bottom of the column and maintained in a 0.05% $NH_4NO_3$ aqueous solution heated at 95° C for a period of time and thereafter dried at 120° and calcined at 700° C. The calcined beads contained equal amounts of $SiO_2$ and $Al_2O_3$ and had a crushing strength of 1.7 kg.

What is claimed is:

1. A process for preparing silica-alumina beads containing silica and at least an equal amount of alumina comprising dispersing as droplets into a hot and practically water-immiscible fluid, an aqueous mixture which comprises finely divided alumina hydrogel, alumina hydrosol as alumina precursors, the weight ratio of said hydrogel to said hydrosol being between 99:1 and 50:50, an alkali silicate and silica gel as silica precursors, the amount of alkali silicate, based on $SiO_2$, not exceeding 20% of the total weight of $SiO_2$ and $Al_2O_3$, and the total amount of alkali silicate and silica gel, based on $SiO_2$, not exceeding 50% of the total weight of $SiO_2$ and $Al_2O_3$ and a water-soluble monomer whose cross-linked polymer is water soluble or forms a gel, said monomer being an acrylic compound of the general formula

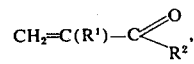

wherein $R^1$ is H or the methylradical and $R^2$ is a $-OR^3$ or $-NR^3R^4$ radical with $R^3$ and $R^4$ in such radical being H or a hydrophilic radical, the amount of said monomer being between 5% and 100% of the weight of alumina and silica precursors, based on their oxides, and maintaining the droplets of the aqueous mixture in the hot fluid under polymerization conditions until substantial polymerization of said monomer occurs.

2. The process of claim 1 wherein an aqueous mixture is prepared comprising alumina hydrogel and hydrosol as $Al_2O_3$ precursors, an alkali silicate and silica gel as $SiO_2$ precursors, the amount of alkali silicate, based on $SiO_2$, not exceeding 20% of the total weight of $SiO_2$ and $Al_2O_3$, and the total amount of alkali silicate and silica and silica gel, based on $SiO_2$, not exceeding 50% of the total weight of $SiO_2$ and $Al_2O_3$ silica and alumina generators, and a water-soluble monomer whose uncross-linked polymer is water-soluble or forms a gel, said aqueous mixture is dispersed as droplets into a hot and substantially water-immiscible fluid, under polymerization conditions such as to bring about substantial polymerization of the monomer contained in each droplet of aqueous mixture, said beads are recovered and thereafter dried and calcined to obtain silico-alumina beads containing silica and at least an equal amount of alumina.

3. The process of claim 1, wherein the weight ratio is between 85 : 15 and 55 : 45.

4. The process of claim 1 wherein the aqueous mixture has a pH of between about 3 and 4.

5. The process of claim 1 wherein said aqueous mixture contains a cross-linking agent which can react with said monomers.

6. The process of claim 1 wherein silica gel is used in an undried form.

7. The process of claim 1 wherein the polymerization of the aqueous mixture is carried out by dispersing the aqueous mixture as droplets and passing these droplets to a counter-current flow of a hot dry gas.

8. The process of claim 1 wherein the polymerization of the aqueous mixture is carried out by dispersing the aqueous mixture as droplets at the bottom of a column containing a liquid having a density higher than that of the beads, and recovering the beads at the surface of the liquid.

9. The process of claim 1 wherein the polymerization of the aqueous mixture is carried out by dispersing the aqueous mixture as droplets at the head of a column containing a liquid having a density lower than that of the beads, and recovering the bead at the bottom of the column.

10. The process of claim 1 wherein said beads are impregnated with one or more active catalytic agents or compounds which generate active catalytic agents upon subsequent thermal treatment of the impregnated beads.

11. Silico-alumina beads prepared by the process of claim 1.

12. Catalyst compositions prepared by the process of claim 10.

* * * * *